US006633660B1

United States Patent
Schotland

(10) Patent No.: US 6,633,660 B1
(45) Date of Patent: Oct. 14, 2003

(54) NEAR-FIELD TOMOGRAPHY

(76) Inventor: John Carl Schotland, 2 Glen Forest, Ladue, St. Louis County, MO (US) 63124

(*) Notice: Subject to any disclaimer, the term of this patent is extended or adjusted under 35 U.S.C. 154(b) by 0 days.

(21) Appl. No.: 09/490,615

(22) Filed: Jan. 25, 2000

Related U.S. Application Data

(60) Provisional application No. 60/118,918, filed on Feb. 5, 1999.

(51) Int. Cl.[7] ............................. G06K 9/36; G01J 5/02; G01N 21/00
(52) U.S. Cl. ..................... 382/131; 250/341.8; 356/337
(58) Field of Search ................................. 382/131, 128, 382/321, 312; 128/916; 73/602, 600, 443, 606; 702/39, 159; 250/341.8; 356/337, 432

(56) References Cited

U.S. PATENT DOCUMENTS

| | | | | |
|---|---|---|---|---|
| 4,662,222 A | * | 5/1987 | Johnson | 73/602 |
| 4,947,034 A | * | 8/1990 | Wickramasinghe et al. | 250/216 |
| 5,018,865 A | * | 5/1991 | Ferrell et al. | 356/600 |
| 5,077,695 A | * | 12/1991 | Khuri-Yakub et al. | 367/7 |
| 5,286,970 A | * | 2/1994 | Betzig et al. | 250/227.26 |
| 5,410,151 A | * | 4/1995 | Buckland | 250/227.26 |
| 5,479,024 A | * | 12/1995 | Hillner et al. | 250/458.1 |
| 5,548,113 A | * | 8/1996 | Goldberg et al. | 250/234 |
| 5,602,820 A | * | 2/1997 | Wickramasinghe et al. | 369/126 |
| 5,666,197 A | * | 9/1997 | Guerra | 356/512 |
| 5,739,527 A | * | 4/1998 | Hecht et al. | 250/234 |
| 5,774,221 A | * | 6/1998 | Guerra | 356/602 |
| 5,793,743 A | * | 8/1998 | Duerig et al. | 369/126 |
| 5,832,922 A | * | 11/1998 | Schotland | 600/407 |
| 5,874,726 A | * | 2/1999 | Haydon | 250/201.1 |
| 5,883,872 A | * | 3/1999 | Kino | 369/112.24 |
| 5,905,261 A | * | 5/1999 | Schotland et al. | 250/341.8 |
| 6,016,376 A | * | 1/2000 | Ghaemi et al. | 385/116 |
| 6,020,988 A | * | 2/2000 | Deliwala et al. | 359/276 |
| 6,046,448 A | * | 4/2000 | Sato et al. | 250/234 |
| 6,111,416 A | * | 8/2000 | Zhang et al. | 324/753 |
| 6,173,604 B1 | * | 1/2001 | Xiang et al. | 73/105 |
| 6,180,415 B1 | * | 1/2001 | Schultz et al. | 436/518 |

FOREIGN PATENT DOCUMENTS

DE 19714346 A1 * 10/1998 ............ H01J/37/28

OTHER PUBLICATIONS

Ohtsu, M., Progress of high–resolution photon scanning tunneling microscopy due to a nanometric fibre probe, Journal of Lightwave Technology, Jul. 1995, vol 13, iss 7, pp. 1200–1221.*

* cited by examiner

Primary Examiner—Bhavesh M. Mehta
Assistant Examiner—Christopher Sukhaphadhana
(74) Attorney, Agent, or Firm—John T. Peoples

(57) ABSTRACT

A method for the direct reconstruction of an object from measurements, called scattering data, of scattered waves due to probing waves as emitted by a source. The scattering data is related to a scattering kernel by an integral operator. The image is directly reconstructed by executing a prescribed mathematical algorithm, as determined with reference to the integral operator, on the scattering data.

8 Claims, 3 Drawing Sheets

NEAR-FIELD TOMOGRAPHY

CROSS REFERENCE TO RELATED APPLICATION

This application is a non-provisional application of provisional application Ser. No. 60/118,918 filed Feb. 5, 1999.

BACKGROUND OF THE INVENTION

1. Field of the Invention

This invention relates to microscopy and, more particularly, to near-field microscopy wherein an image of an object is directly reconstructed with sub-wavelength resolution.

2. Description of the Background Art

There has been considerable recent interest in the development of near-field methods for optical microscopy. This interest is motivated by the remarkable ability of such methods to image spatial structure with sub-wavelength resolution. It is now well recognized, however, that the analysis and interpretation of near-field images is somewhat problematic. The difficulty can be traced to the fact that the near-field scattered wave is sensitive to variations in both the structure and the dielectric permittivity of the sample under investigation. As a consequence, the connection between the image and the structure of the sample is unclear, with the implication that different samples may give rise to the same image. For this reason there is substantial interest in the near-field inverse scattering problem. To date, work in this direction has been limited to the study of the inverse problem for homogeneous media.

Representative of the art in this technological area are the following U.S. Patents: (a) Fiber Optic Probe for Near Field Optical Microscopy (U.S. Pat. No. 5,485,536); (b) Method and Apparatus for Performing Near-Field Optical Microscopy (U.S. Pat. No. 5,479,024); (c) Near Field Scanning Tunneling Optical Microscope (U.S. Pat. No. 5,382,789; and (d) Near Field Optical Microscopic Examination of a Biological Specimen (U.S. Pat. No. 5,286,970).

The art is devoid of any teachings or suggestions for treating the inverse scattering procedure which is applicable to the near-field case.

SUMMARY OF THE INVENTION

These shortcomings, as well as other limitations and deficiencies, are obviated, in accordance with the present invention, by devising explicit inversion formulas and obtaining from the observation that it is possible to construct the singular value decomposition of the high-frequency part of the scattering operator. This approach provides considerable insight into the mathematical structure of the inverse problem and allows the separation of effects due to structure and permittivity.

The scattering problem for scalar waves in the near field is treated herein. An analytic solution to this problem is presented in the form of an explicit inversion formula which are applicable to near-field optical microscopy.

In accordance with a broad method aspect of the present invention, an image of an object is generated by: (a) probing the object with a source of waves; (b) detecting scattered waves from the object; and (c) directly reconstructing the image by executing a prescribed mathematical algorithm on the scattered waves which generates the image with sub-wavelength spatial resolution.

BRIEF DESCRIPTION OF THE DRAWING

To facilitate understanding, identical reference numerals have been used, where possible, to designate identical elements that are common to the figures.

DETAILED DESCRIPTION

Function Theoretic Basis

Figure 1:
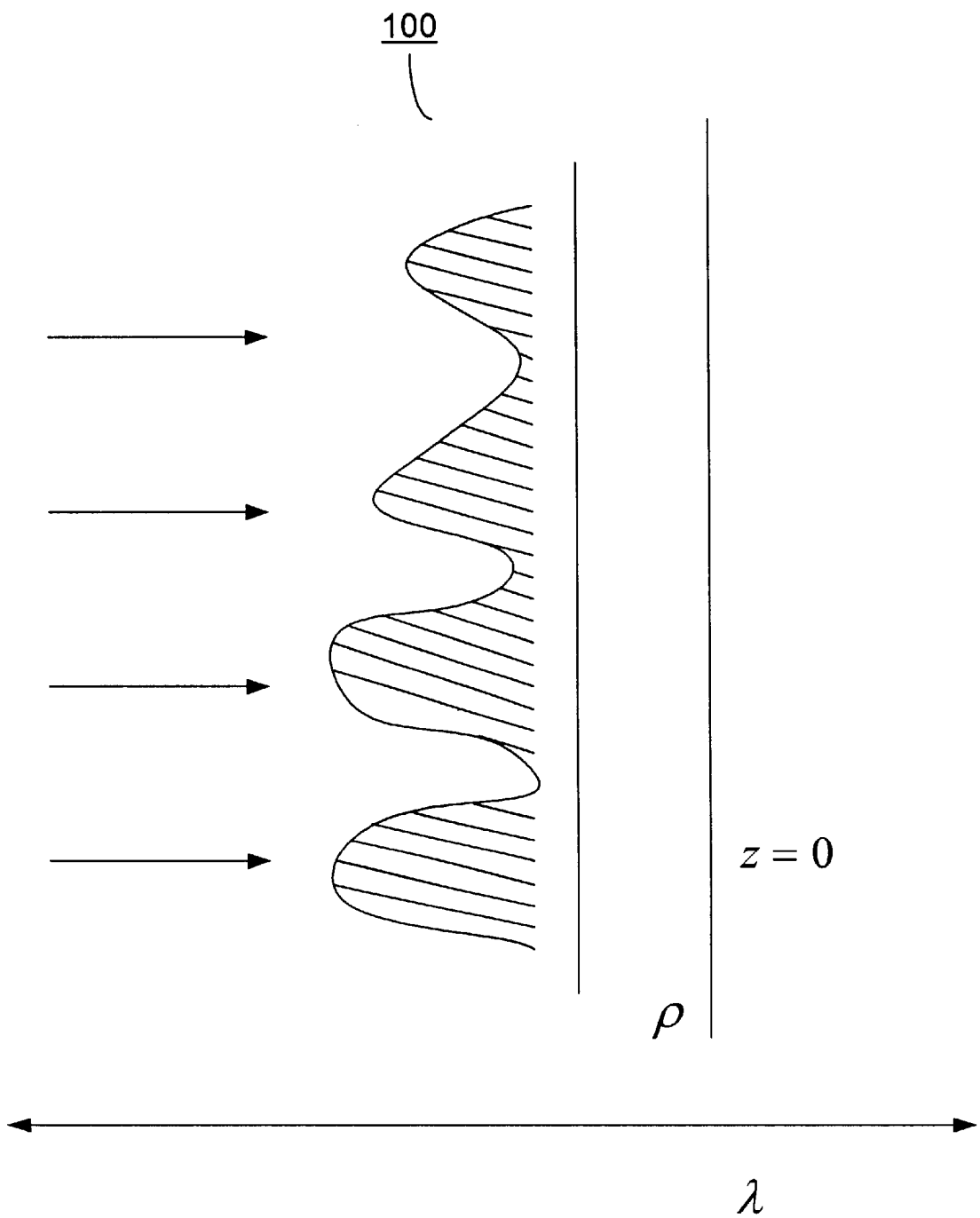
FIG. 1 is a pictorial representation whereby a plane wave scatters off an object.

To understand the principles in accordance with the present invention, an experiment in which a monochromatic plane wave is incident on a medium with relative dielectric permittivity $\epsilon(r)$ is considered. For immediate tractability, the effects of polarization are ignored and only the case of a scalar wave is considered. The physical situation envisioned is shown by pictorial representation 100 in FIG. 1 where the plane wave scatters off the sample in the transmission geometry. The near-field scattered wave is then measured on a surface adjacent to the sample. Note that it is assumed that the measurement is holographic in the sense that the amplitude and phase of the wave are both detected. The energy density of the wave U(r) satisfies the reduced wave equation $$(\nabla^2 + k_0^2)U(r) = -k_0^2 \epsilon(r)U(r) \tag{1}$$

where $k_0^2 = 2\pi/\lambda$ is the wavenumber of the incident wave.

Following standard procedures, it is found that the scattered wave U(r) may be expressed to lowest order in perturbation theory in $\epsilon(r)$ as $$U_s(r) = \int d^3r' e^{ik-r'} G(r,r')V(r') \tag{2}$$

where the scattering potential $V(r) = k_0^2 \epsilon(r)$ and $$G(r, r') = \frac{1}{4\pi} \frac{e^{ik_0|r-r'|}}{|r-r'|} \tag{3}$$

is the outgoing-wave Green's function.

For the remainder of this description, it is assumed that the scattered wave is measured on the plane z=0. To this end, the transverse coordinate is denoted by $\rho$ and by $U_\perp(\rho)$ and $K(\rho,r')$ the restrictions of $U_s(r)$ and $G(r,r')$ to the measurement plane. In this notation equation (1) becomes:

$$U_\perp(\rho) = \int d^3r' e^{ik-r'} K(\rho,r')V(r') \tag{4}$$

To facilitate the discussion, the decomposition of $K(\rho,r')$ into plane waves is introduced:

$$K(\rho,r') = K_<(\rho,r') + K_>(\rho,r') \tag{5}$$

where $$K_<(\rho, r') = \frac{i}{2(2\pi)^2} \int_{|q| \leq k_o} d^2q\, e^{iq\cdot(p-p')} (k_o^2 - q^2)^{-\frac{1}{2}} \exp\left[i(k_o^2 - q^2)^{\frac{1}{2}}|z'|\right] \text{ and} \tag{6}$$

$$K_>(\rho, r') = \frac{i}{2(2\pi)^2} \int_{|q| \leq k_o} d^2q\, e^{iq\cdot(p-p')} (q^2 - k_o^2)^{-\frac{1}{2}} \exp\left[i(q^2 - k_o^2)^{\frac{1}{2}}|z'|\right] \tag{7}$$

Here $K_<(\rho,r')$ is the low spatial-frequency part of $K(\rho,r')$ and is expressed as an expansion in homogeneous plane waves.

The corresponding high frequency part of K(ρ,r') is denoted by $K_>(\rho,r')$ and is represented as an expansion in evanescent waves. In the sequel, $K_>(\rho,r')$ is referred to as the "scattering kernel" (based upon the form of equation (8) below). In the far field, the effect of evanescent waves can be neglected and only $K_<(\rho,r')$ contributes to $U_\perp(\rho)$. As a consequence, the well known diffraction-limited resolution of λ/2 is recovered. In the near field, both $K_<(\rho,r')$ and $K_>(\rho,r')$ contribute to $U_\perp(\rho)$. Since the interest is in reconstructing ε(r) on length scales small compared to the wavelength, the focus is on the high-pass filtered form of $U_\perp(\rho)$ which obeys the integral equation $$U_{\perp>}(\rho) = \int d^3 r' e^{ik \cdot r'} K_>(\rho,r') V(r') \tag{8}$$

In the inverse problem, it is desired to reconstruct ε(r) from near-field measurements of $U_{\perp>}(\rho)$; the result of these measurements is referred to as the "scattering data". The approach to this problem described here involves the construction of an explicit inversion formula for the integral equation (8). To proceed, consider p wavevectors $k_1, \ldots, k_p$ and the corresponding measurements of $U_{\perp>}(\rho)$ which are denoted by $U_i(\rho)$ for i=1, ..., p. The image reconstruction problem consists of solving the system of integral equations $$U_i(\rho) = \int d^3 r' A_i(\rho,r') V(r') \tag{9}$$

where $A_i(\rho,r')$ is defined by equation (8) for each wavevector $k_i$ with $|k_i|=k_0$. The solution to equation (9) follows from the singular value decomposition (SVD) of the $A=(A_1, \ldots, A_p)$ which is given by $$A(\rho, r') = \int d^2 q \sum_l \sigma_{ql} \phi_{ql}(\rho) \psi_{ql}^*(r') \tag{10}$$

where l=1, ..., p. Here the singular functions $\phi_{ql}(\rho_1)$ and $\psi_{ql}(r)$ and singular values $\sigma_{ql}$ are defined by $$A^* A \psi_{ql} = \sigma_{ql}^2 \psi_{ql} \tag{11}$$

and $$A \psi_{ql} = \sigma_{ql} \phi_{ql} \tag{12}$$

To make further progress, the Singular Value Decomposition of each $A_i(\rho,r')$ is required and which may be obtained from equation (7) and is given by $$A_i(\rho,r') = \int d^2 q \sigma_q^i g_q^i(\rho) f_q^{i*}(r') \tag{13}$$

where $$g_q^i(\rho) = \frac{1}{2\pi} e^{i(q+q_i) \cdot \rho}, \tag{14}$$

$$f_q^i(r) = \frac{1}{2\pi}((q+q_i)^2 - k_0^2)^{\frac{1}{4}} e^{iq \cdot \rho} \exp\left[-((q+q_i)^2 - k_0^2)^{\frac{1}{2}}|z| - i k_{zi} z\right], \tag{15}$$

$$\sigma_q^i = \frac{1}{2}((q+q_i)^2 - k_0^2)^{-\frac{3}{4}} \text{ if } |q+q_i| > k_0 \tag{16a}$$

or $$\sigma_q^i = 0 \text{ if } |q+q_i| \leq k_0, \tag{16b}$$

and $k_i = (q_i, k_{zi})$.

This result can be used to obtain the identity $$A_1^* A_i f_q^j = \chi_{ij}(q)(\sigma_q^i)^2 f_q^i \tag{17}$$

where the overlap function $\chi_{ij}(q)$ is defined by $$(f_q^i, f_{q'}^i) = \chi_{ij}(q) \delta(q-q') \tag{18}$$

Returning now to the problem of constructing the SVD of A equation (11) is rewritten as $$\sum_{i=1}^p A_i^* A_i \psi_{ql} = \sigma_{ql}^2 \psi_{ql} \tag{19}$$

Next, make the ansatz $$\psi_{ql}(r) = \frac{1}{\sigma_{ql}} \sum_i \sigma_q^i c_{li}(q) f_q^i(r) \tag{20}$$

and use equations (17) and (18) to find that the coefficients $c_i(q)$ satisfy the equation $$\sum_j M_{ij}(q) c_{ij}(q) = \sigma_{ql}^2 c_{li}(q) \tag{21}$$

where $$M_{ij}(q) = \chi_{ij}(q) \sigma_q^i \sigma_q^j \tag{22}$$

Note that $c_l(q)$ is an eigenvector of $M_{ij}(q)$ with eigenvalue $\sigma_{ql}^2$ and since $M_{ij}(q)$ is symmetric, $c_l(q)$ is chosen to be orthonormal. Now use equation (12) to obtain the $\phi_{ql}(r)$ which are given by $$\phi_{ql}(\rho) = c_l(q) g_q^i(\rho) \tag{23}$$

The solution to equation (9) may now be expressed as $$V(r) = \int d^2 \rho' A^+(r,\rho') U(\rho') \tag{24}$$

where $$A^+(r, \rho') = \int d^2 q \sum_l \frac{1}{\sigma_{ql}} \psi_{ql}(r) \phi_{ql}^*(\rho') \tag{25}$$

is the generalized inverse of A(ρ,r'). Finally, using equations (24) and (25) to obtain the main result:

$$V(r) = \int d^2 \rho' \int d^2 q \sum_{l,i} \frac{1}{\sigma_{ql}} \psi_{ql}(r) \phi_{qli}(\rho') U_i(\rho) \tag{26}$$

which is the inversion formula for the near-field inverse scattering problem.

Several comments on the foregoing results are necessary. First, the solution to the inverse problem that was constructed is the unique solution of minimum norm given the scattering data. This statement follows from the result that the singular value decomposition provides the solution to equation (9) that belongs to the orthogonal complement of the null space of the integral equation. It is important to note that the size of the null space in general decreases when the number of wavevectors increases, and thus the inversion procedure is systematically improvable.

Second, for large |q| the singular values are given by $$\sigma_l \sim |q|^{-\frac{3}{2}}.$$

As a consequence, it may be desirable in a practical sense to introduce a cutoff on the wavevector integration thereby effecting a regularization of the inverse problem. Note that regularization here has a natural physical interpretation—it simply sets the spatial resolution of the reconstruction.

Finally, it is important to appreciate that an algorithm based on equation (26) has computational complexity $O(N^2)$ where N is the number of pixels in the image. This should be compared with the $O(N^3)$ complexity of a direct numerical inversion of integral equation (26).

In summary, the inverse scattering method described is utilized for reconstructing the dielectric permittivity using near-field scattered waves. It is readily appreciated that the approach represents an analytic rather than a numerical solution to the image reconstruction problem. Furthermore, the results are of general physical interest since they are applicable to imaging with any scalar wave in the near field.

System

Figure 2:
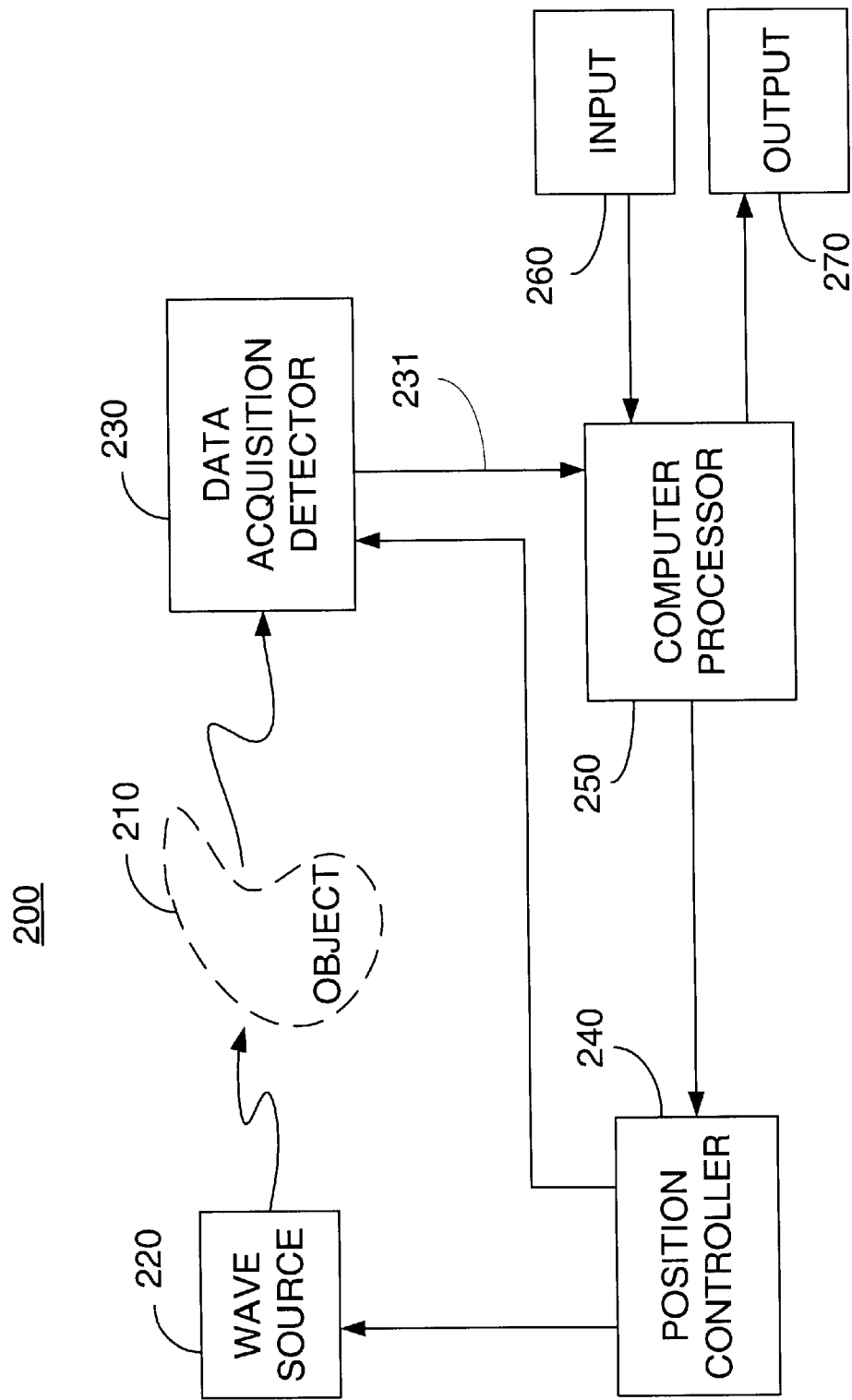
FIG. 2 depicts a system for probing the object with waves to produce scattered waves which are then used to directly reconstruct the image.

As depicted in high-level block diagram form in FIG. 2, system 200 is an imaging system for generating an image of an object using measurements of scattered waves emanating from an object in response to waves impinging the object. In particular, object 210 is shown as being under investigation. System 200 is composed of: wave source 220 for probing the object 210; data acquisition detector 230 for detecting the scattering data corresponding to the scattered waves from object 210 at one or more locations proximate to object 210; position controller 240 for controlling the location of detector 230 relative to source 220; and computer processor 250, having associated input device 260 (e.g., a keyboard) and output device 270 (e.g., a graphical display terminal). Computer processor 250 has as its inputs positional information from controller 240 and the measured scattering data from detector 230.

The point of departure between the inventive subject matter herein and the prior art resides in the processing of the measured scattering data. Computer 250 stores a computer program which implements the direct reconstruction algorithm; in particular, the stored program processes the measured scattering data to produce the image of the object under study using a prescribed mathematical algorithm. The algorithm is, generally, determined with reference to an integral operator relating the scattering data to the scattering kernel (e.g., the integral equation of equation (8)).

Flow Diagram

Figure 3:
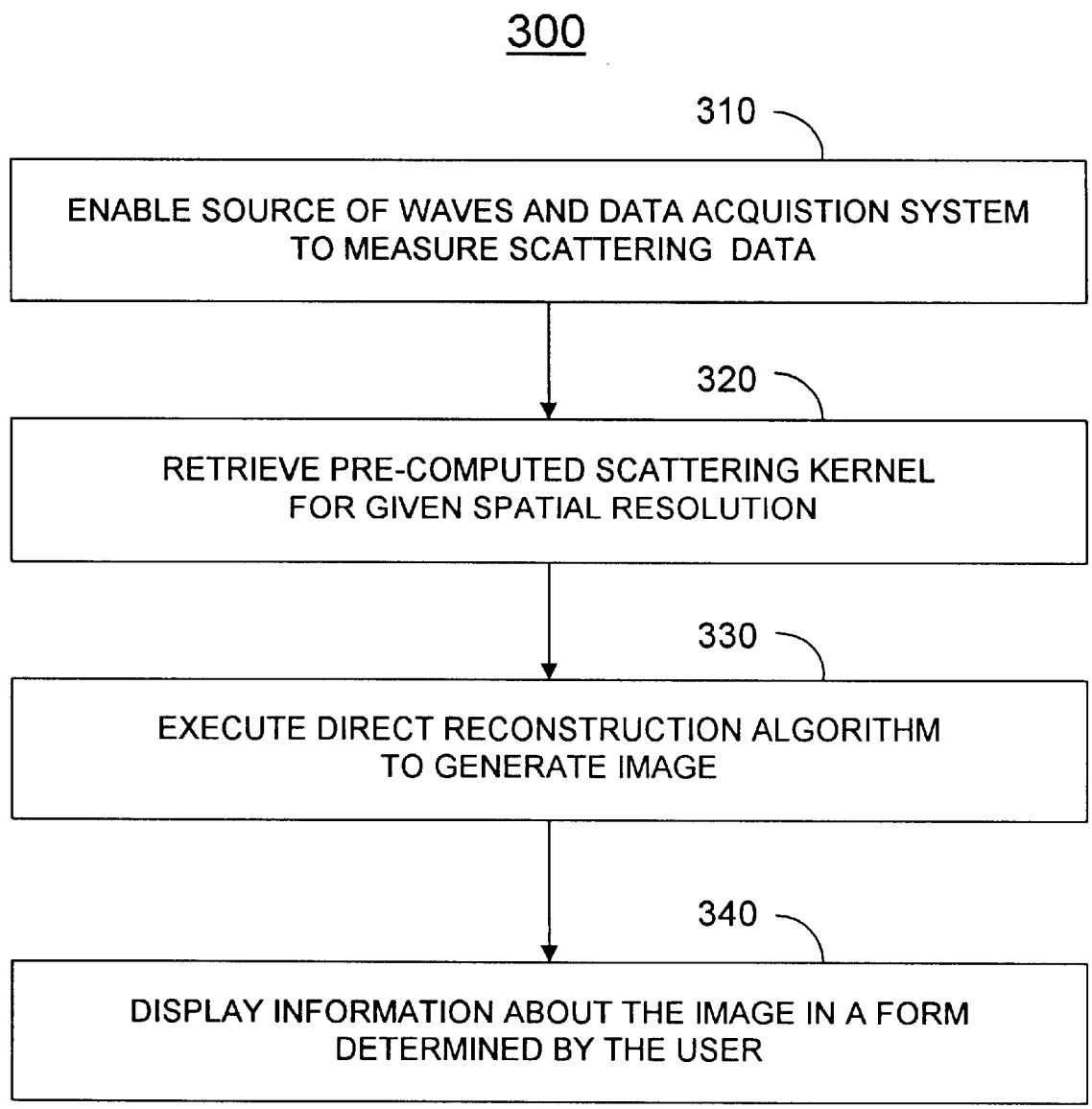
FIG. 3 is a flow diagram for directly reconstructing the image from the scattered waves excited by a probing wave.

The methodology carried out by the present invention is set forth in high-level flow diagram 300 of FIG. 3 in terms of the illustrative system embodiment shown in FIG. 2. With reference to FIG. 3, the processing effected by block 310 enables source 220 and data acquisition detector 230 so as to measure the scattering data emanating from object 210 due to impinging waves from source 220. These measurements are passed to computer processor 250 from data acquisition detector 230 via bus 231. Next, processing block 320 is invoked to retrieve the pre-computed and stored scattering kernel. In turn, processing block 330 is operated to execute the direct reconstruction algorithm set forth with respect to the foregoing equations, thereby determining the permittivity $\epsilon(r)$. Finally, as depicted by processing block 340, the reconstructed image corresponding to the permittivity $\epsilon(r)$ is provided to output device 270 in a form determined by the user; device 270 may be, for example, a display monitor or a more sophisticated three-dimensional display device.

Although various embodiments which incorporate the teachings of the present invention have been shown and described in detail herein, those skilled in the art can readily devise many other varied embodiments that still incorporate these teachings.

What is claimed is:

1. A method for generating an image of an object characterized by a scattering potential comprising probing the object with a source of waves, measuring scattering data produced by scattering of the probing waves in the near-field of the object, wherein the scattering data is related to the scattering potential by an integral operator of the form scattering data=K(scattering potential), where K is the integral operator having an associated scattering kernel known a priori, and directly reconstructing the image by executing a prescribed mathematical algorithm, determined with reference to the integral operator, on the scattering data to generate the image with a sub-wavelength spatial resolution.

2. The method as recited in claim 1 wherein the directly reconstructing includes computing the scattering kernel.

3. A method for generating an image of an object characterized by a scattering potential comprising probing the object with a source of linearly polarized waves, measuring scattering data produced by scattering of the probing waves in the near-field of the object, wherein the scattering data is related to the scattering potential by an integral operator of the form scattering data=K(scattering potential), where K is the integral operator having an associated scattering kernel known a priori, and directly reconstructing the image by executing a prescribed mathematical algorithm, determined with reference to the integral operator, on the scattering data to generate the image with a sub-wavelength spatial resolution.

4. The method as recited in claim 3 wherein the directly reconstructing includes computing the scattering kernel.

5. A system for generating an image of an object characterized by a scattering potential comprising a source of waves for probing the object, a detector for measuring scattering data produced by scattering of the waves in the near-field of the object, wherein the scattering data is related to the scattering potential by an integral operator of the form scattering data=K(scattering potential), where K is the integral operator having an associated scattering kernel known a priori, and a reconstructor, responsive to the detector, for directly reconstructing the image by executing a prescribed mathematical algorithm, determined with reference to the integral operator, on the scattering data to generate the image with a sub-wavelength spatial resolution.

6. The system as recited in claim 5 wherein the reconstructor includes a processor for computing the scattering kernel.

7. A system for generating an image of an object characterized by a scattering potential comprising a source of linearly polarized waves for probing the object, a detector for measuring scattering data produced by scattering of the probing waves in the near-field of the object, wherein the scattering data is related to the scattering potential by an integral operator of the form scattering data=K(scattering potential), where K is the integral operator having an associated scattering kernel known a priori, and a reconstructor, responsive to the detector, for directly reconstructing the image by executing a prescribed mathematical algorithm, determined with reference to the integral operator, on the scattering data to generate the image with a sub-wavelength spatial resolution.

8. The system as recited in claim 7 wherein the reconstructor includes a processor for computing the scattering kernel.

* * * * *